3,046,299
PROCESS FOR THE PREPARATION OF CYCLO-PROPANE-CARBOXYLIC ACIDS OF TRANS-FORM
Marc T. Julia, Paris, France, assignor to Societe des Usines Chimiques Rhone-Poulenc, Paris, France, a corporation of France
No Drawing. Filed June 25, 1959, Ser. No. 822,762
Claims priority, application France July 28, 1958
4 Claims. (Cl. 260—468)

This invention relates to the preparation of cyclopropanecarboxylic acids of trans-form by the conversion of cis-cyclopropanecarboxylic esters into the corresponding trans derivatives.

It is known that the properties of cis- and trans-isomers of a chemical substance capable of existing in these two forms can differ substantially. Thus, for example, the esters of trans-chrysanthemic acid with various cyclopentenolones are more active insecticides than the corresponding esters of the cis-acid. It is therefore useful to be able to employ a method of isomerisation of substances capable of existing in these cis- and trans-forms.

According to the present invention, a process for converting an ester of a cis-cyclopropane-carboxylic acid into the corresponding trans-ester comprises subjecting the said cis ester to the action of a strong base. Preferably according to the invention the strong base used is a strong alkali alcoholate such as, for example, sodium or potassium tert.-amylate, tert.-butylate and dimethylmenzylate. From the esters of trans-form thus obtained, the corresponding acids may be prepared by the usual saponification methods.

In the preferred embodiment of the invention the isomerising reaction is carried out in a solvent medium, e.g. an aromatic hydrocarbon such as benzene, toluene or xylene or an alcohol, preferably the alcohol corresponding to the alkali alcoholate employed. The reaction starts at room temperature and is completed by heating the mixture, preferably at its reflux temperature. When the reaction has ended, water is added to the cooled reaction medium, whereby two phases are produced:

(a) An aqueous phase, which is extracted by means of a solvent, for example ether or benzene; it is possible to obtain from the extracted aqueous phase, by acidification, a small quantity of acid emanating from a partial saponification of the formed trans-ester, and (b) An organic phase containing the greater part of the formed trans-ester. The extract of the aqueous layer is added to this phase and, by evaporation of the solvent, there is obtained the trans-ester, from which the corresponding acid is isolated by saponification by the usual methods.

The following examples will serve to illustrate the invention.

*Example I*

2 g. of cis-2-phenylcyclopropanecarboxylic acid, melting at 102–104° C. are converted in known manner into methyl ester (2.2 g.) by treatment with diazomethane in ethereal solution. To the crude methyl ester are added 10 cc. of sodium tert.-amylate solution in benzene (1.68 mol per litre), and the mixture is left overnight. It is then refluxed for 4 hours, and cooled water is added. The mixture separates into an aqueous phase and an organic phase. The ethereal extract of the aqueous layer is combined with the organic layer and the whole is evaporated. There is thus obtained 2 g. of ester, which is saponified by boiling for 3 hours with 10 cc. of 20% potassium hydroxide solution in methanol. On acidification, crude trans-2-phenylcyclopropanecarboxylic acid is obtained, which gives 1.35 g. of pure trans-acid, M.P. 89–90° C., after recrystallisation from aqueous alcohol.

0.1 g. of pure trans-acid can be derived from the extracted aqueous phase by acidification, extraction and evaporation of the solvent.

*Example II*

To 1.65 g. of cis-methyl-2-phenoxycyclopropanecarboxylate are added 5.4 cc. of sodium tert.-amylate solution in benzene (1.83 mol per litre). The mixture is left in contact for one night and then heated under reflux for 3 hours. It is then treated as in Example I and in all 1.096 g. of trans-2-phenoxycyclopropane carboxylic acid, M.P. 109–110° C., are obtained.

*Example III*

1.9 g. of cis-methyl-2-phenoxycyclopropane carboxylate are heated for 2 hours under reflux with 20 cc. of potassium tert.-butylate solution in tert.-butyl alcohol (1.4 mol of alcoholate per litre of solution). After cooling, water is added, and the whole is extracted with ether. The product is treated as in Example I, and there are obtained 1.69 g. of trans-2-phenoxycyclopropanecarboxylic acid, M.P. 110–111° C.

*Example IV*

To 1.8 g. of cis-methyl chrysanthemate are added 20 cc. of sodium tert.-amylate solution in benzene (1.8 mol per litre). After standing for several hours, the mixture is heated under reflux for 3 hours. Treatment as in Example I yields 1.436 g. of trans-chrysanthemic acid, M.P. 45–47° C.

This transposition may also be effected by means of potassium tert.-butylate in solution in tert.-butyl-alcohol.

I claim:

1. A process for converting the methyl ester of cis-chrysanthemic acid into the corresponding trans ester which comprises subjecting the said cis-ester to the action of an alkali metal alcoholate.

2. A process for the production of trans-chrysanthemic acid which comprises converting the methyl ester of cis-chrysanthemic acid into the corresponding trans ester by subjecting the cis ester to the action of an alkali metal alcoholate, isolating the trans ester from the reaction mixture and subjecting it to saponification.

3. A process for the production of trans-chrysanthemic acid which comprises converting the methyl ester of cis-chrysanthemic acid into the corresponding trans ester by subjecting the cis ester to the action of a compound selected from the class consisting of the sodium and potassium derivatives of t-amyl alcohol, t-butyl alcohol and dimethylbenzyl alcohol, isolating the trans ester from the reaction mixture and subjecting it to saponification.

4. A process for the production of trans-chrysanthemic acid which comprises converting the methyl ester of cis-chrysanthemic acid into the corresponding trans ester by subjecting the cis ester to the action of an alkali metal alcoholate in a medium of a solvent which is the alcohol of said alcoholate, isolating the trans ester from the reaction mixture and subjecting it to saponification.

References Cited in the file of this patent

Kohler et al.: JACS, vol. 44, pages 624–34 (1922).
Gilman: "Organic Chemistry," vol. 1, pages 453, 458, J. Wiley (1943).
Piehl et al.: JACS, vol. 75, pages 5023–6 (1953).
Royals: Advanced Organic Chemistry, pages 183–5 (1954), Prentice-Hall.